United States Patent [19]

Bourne

[11] 4,128,297
[45] Dec. 5, 1978

[54] VARIABLE LEAD OPTICAL TRACING MACHINE WITH SCANNING AND VARI-FOCAL LENS

[75] Inventor: Arnold H. Bourne, Hamilton, Canada

[73] Assignee: Westinghouse Canada Limited, Hamilton, Canada

[21] Appl. No.: 844,873

[22] Filed: Oct. 25, 1977

[30] Foreign Application Priority Data

Feb. 23, 1977 [CA] Canada .................. 272442

[51] Int. Cl.² .................................. G01B 27/17
[52] U.S. Cl. ..................... 350/6.1; 350/6.9; 250/202
[58] Field of Search ............ 350/6.9, 6.4, 6.3, 6.2, 350/40–44, 81, 184, 6.1; 250/202

[56] References Cited

U.S. PATENT DOCUMENTS

| 2,930,894 | 3/1960 | Bozeman | 350/184 |
|---|---|---|---|
| 3,268,731 | 8/1966 | Brouwer et al. | 250/202 |
| 3,479,513 | 11/1969 | Simpson et al. | 250/202 |
| 3,496,437 | 2/1970 | Layden | 250/202 |
| 3,499,155 | 3/1970 | Turbett | 250/202 |
| 3,704,372 | 11/1972 | Parker et al. | 250/202 |
| 3,704,373 | 11/1972 | Bradwell et al. | 250/202 |
| 4,072,301 | 2/1978 | Brouwer | 250/202 |

FOREIGN PATENT DOCUMENTS 917773 12/1972 Canada ............................ 350/6.9

*Primary Examiner*—Jon W. Henry
*Attorney, Agent, or Firm*—Robert H. Fox; Edward H. Oldham

[57] ABSTRACT

This application relates to circular scanning line tracers or edge tracers and has particular reference to means for producing adjustable lead. In tracing apparatus having a circular scan, the scanner scans in advance of the point of rotation of the tracing mechanism by an amount referred to as the lead. This lead ideally varies depending on the tracing velocity. It is proposed to apply a vari-focal lens to the optics to provide a scanning circle of adjustable diameter to vary the lead.

2 Claims, 1 Drawing Figure

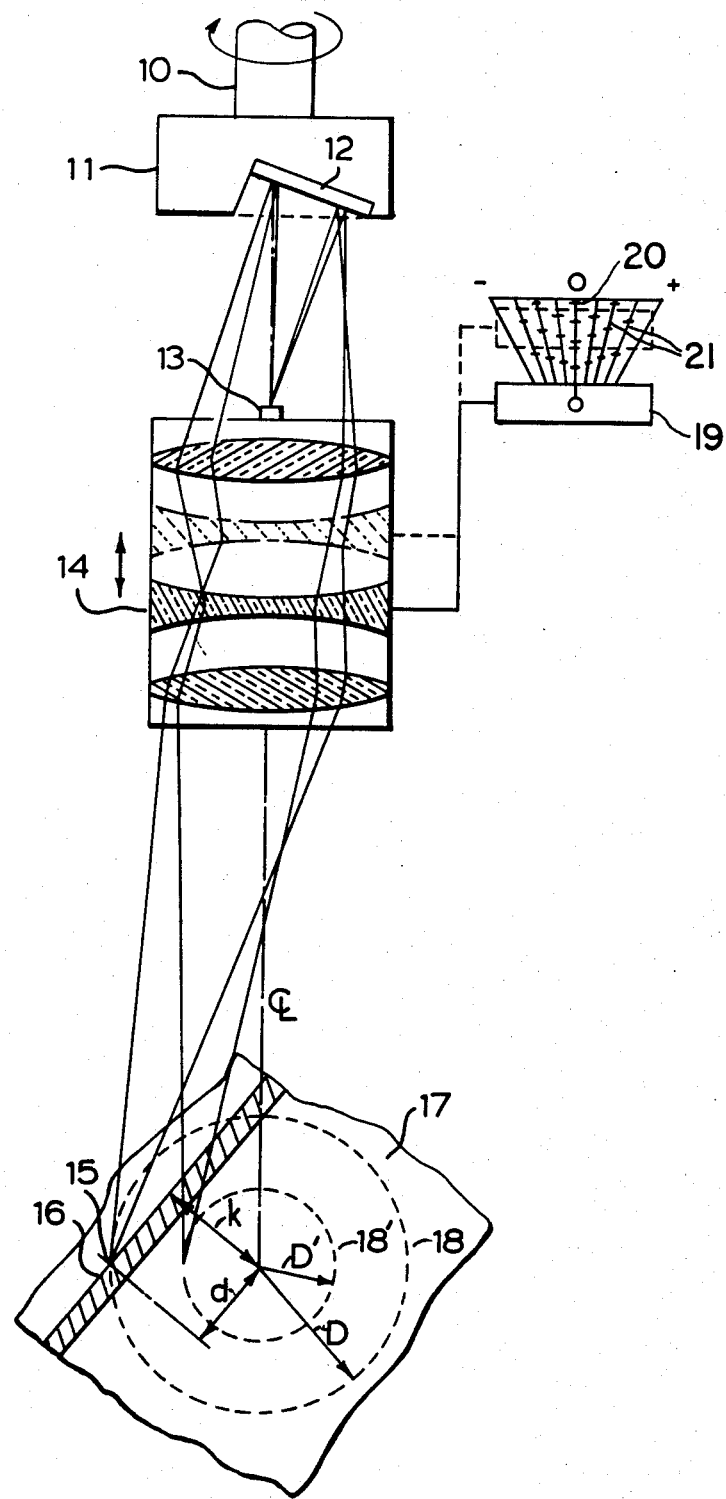

VARIABLE LEAD OPTICAL TRACING MACHINE WITH SCANNING AND VARI-FOCAL LENS

BACKGROUND OF THE INVENTION

Optical tracers are well known in the art as means for tracing patterns for controlling machines tools or similar equipment in accordance with the pattern. One class of such tracers includes those which are known as circular scanning tracers. A typical example of such a scanning tracer is shown in Canadian Pat. No. 917,773 issued Dec. 26, 1972, assigned to the assignee of the present application. The center point of the circular scan of such a machine may be referred to as its steering axis, since the line through this point vertical with reference to the plane of the pattern being traced, is the point of steering rotation of the system. Both the scanner and the cutting tool are symmetrical about such an axis, although the cutting tool will be displaced from the pattern either to an equivalent location to one side or an equivalent location vertically above or below the plane of the pattern. In any event, both the scanner and the machine tool have a reference axis with respect to which their subsequent direction of motion may be described in direction and velocity.

It is also necessary that the scanner observe the direction of the pattern in advance of the steering axis in order to provide advanced steering information so that the direction of the pattern with reference to the current position of the scanner may be used to determine the direction or progress of the machine. Recognizing that the scanner together with the drive mechanism forms part of a servo loop, it will be understood that the point of observation of the pattern by the scan with reference to the steering axis is critical to the stability and effectiveness of the servo loop. The distance between the point of observation and the steering axis is generally referred to as the lead of the machine.

Similarly, there is a further offset which is necessary in most equipment and that is the kerf offset of the tool. Most machine tools including gas torches, when cutting, remove a strip of material of a given width referred to as kerf. In order that a piece be cut to a desired size, the machine tool must not move along a pattern of the desired size, otherwise the portion of the material removed would be removed from the material being cut, reducing it in size from the size of the pattern. This offset of both the steering axis of the tracer and the steering axis of the tool is referred to as kerf adjustment. Normally speaking, this adjustment must be variable to allow for tool diameter or width of cut and also must be made positive or negative depending on whether the machine is cutting inside or outside the pattern and whether the tracing is clockwise or counterclockwise. All the foregoing problems have been recognized in the past and various alternatives have been provided to correct for lead and kerf adjustment.

A typical example of lead adjustment, as disclosed in Canadian Pat. No. 917,773 above, provided for varying diameters of circular scan by substituting differently inclined angular mirrors in a circular scanning system where the scan was produced mechanically by rotating the mirror about the scanning axis by means of a motor. Obviously, this solution requires disassembly of the scanning apparatus to change lead. Lead on the other hand really should be changed in accordance with the tracing velocity of the machine, becuase as will be understood, the important factor in a servo mechanism of this type is a time factor between the steering axis and the tracing point and if the diameter of the circle remains constant, the time factor varies depending on velocity.

SUMMARY OF THE INVENTION

In accordance with the present invention, it is proposed to provide an optical solution to the variable lead problem by introducing a vari-focal lens commonly called a "zoom" lens into the optics of the system, whereby diameter of the circle scanned can be varied without changing the mechanics of the system. In addition to providing a simpler mode of changing the lead, the introduction of the vari-focal lens also results in a more consistent scanning pulse and also permits the interlinking of the kerf offset with the lead adjustment.

A clearer understanding of my invention may be had from consideration of the following drawing, which is a schematic representation of the optics of a mechanical circular scanning tracer.

It will be assumed that the tracing system and its mechanical scanner is substantially as described in Canadian Pat. No. 917,773 above, and the shaft 10 is driven by a suitable motor associated with other related equipment. This shaft 10 has mounted on its end a hub 11 on which is mounted a mirror 12 which is tilted with respect to the axis of the shaft. An opto-electronic device 13, such as a photo-transistor, is mounted below the hub 11 and on the axis of shaft 10. Below the opto-electronic device 13 is a vari-focal lens 14 which comprises several optical elements in a manner well known in the art to produce a vari-focal lens. The lens 14 focuses a point 15 onto the photo-transistor 13. The point 15 is a part of a pattern 16 which exists on the surface 17. As will be seen as shaft 10 rotates, it causes the point observed by the photo-transistor to move in a circular manner over the surface 17 describing a circular path 18 which is shown as a simple line for simplicity. This circular path crosses the pattern at a point in advance of the steering axis of the optical system by an amount designated d and offset to one side from the pattern by an amount designated k.

As will be understood, by adjustment of the zoom lens, the diameter of circle 18 can be increased or reduced. The diameter D can be read off the diameter scale 20 where the zoom lens adjuster 19 intersects the scale which is marked on the zero graduation of the kerf offset scale 21. For example, the diameter D can be changed to D' as shown on the drawing producing circle 18' which results in a smaller d an a smaller k.

To enable the kerf scale on the equipment to read the same irrespective of the adjustment of the zoom lens, the zoom lens is intercoupled with the scale for the kerf adjustment in the manner shown, whereby the graduations for the kerf adjustment scale vary as the zoom lens is adjusted. The kerf adjustment is of the type described in Canadian Pat. No. 917,773 above and indicates on the scale the number of units the center of the cut is offset from the edge of the pattern and whether this displacement is in a positive or a negative direction. As the zoom lens is adjusted, the scale for this kerf adjustment is changed automatically, thus permitting the operator to make a consistent number of units adjustment, irrespective of the positioning of the zoom lens.

While the diameter D can be read off the diameter scale 20 the lead d only corresponds to diameter D when the kerf is zero. As will be seen, at any other adjustments, d is less than D and the other graduations on the kerf scale 21 can be calibrated to show the actual value of d for various kerf adjustments. The lead or d can then be read by noting the intersection of the adjuster 19 on the kerf graduation corresponding to the kerf setting.

While the application of the vari-focal lens has been described in association with a mechanical circular scanning system, it will be understood that its application is more general. For example, the scanning can be accomplished by sequential selection of a series of opto-electronic devices arranged in a circle which may produce an effective circular scan, or the opto-electronic devices may be limited to only a sector of a circle. In any case, the effective lead of the system may be varied by simple adjustment of the vari-focal lens.

As was indicated above, there is a direct relationship between machine speed and lead and for operating convenience and simplicity, it may be found desirable to provide a coupling, mechanical for example, between the adjustment of the vari-focal lens, i.e. lead, and the machine speed control, whereby speed adjustment automatically selects the most advantageous lead adjustment.

The embodiments of the invention in which an exclusive property or privilege is claimed are defined as follows:

1. A circular scanning optical pattern tracer including a vari-focal lens in the optical system, whereby the diameter of the scanning circle may be varied by adjustment of the vari-focal lens, including a kerf offset control and adjustable scale therefor, and a means of coupling the adjustable scale and the vari-focal lens adjustment whereby variations of the lead adjusts the kerf offset scale in such a manner that the kerf offset scale maintains calibration when the diameter of the scanning circle is varied.

2. A circular scanning optical pattern tracer as claimed in claim 1 wherein adjustment of the vari-focal lens indicates, on a calibrated scale, the lead of the tracer.

* * * * *